United States Patent [19]  [11] 3,954,796
Kuster [45] May 4, 1976

[54] TETRA-(ALKYLSULPHAMOYL)-COPPER PHTHALOCYANINES AND A PROCESS FOR THEIR MANUFACTURE

[75] Inventor: Werner Kuster, Basel, Switzerland

[73] Assignee: Ciba-Geigy Corporation, Ardsley, N.Y.

[22] Filed: July 10, 1974

[21] Appl. No.: 487,106

[30] Foreign Application Priority Data
July 19, 1973  Switzerland...................... 10582/73

[52] U.S. Cl................................ 260/314.5; 8/54.2; 8/162 R; 8/178 R; 8/179; 106/23; 428/432; 428/470; 428/474; 428/537
[51] Int. Cl.²......................................... C09B 47/04
[58] Field of Search................................ 260/314.5

[56] References Cited
UNITED STATES PATENTS
2,300,572  11/1942  Hoyer et al...................... 260/314.5
3,759,947  9/1973  Pugin et al...................... 260/314.5
FOREIGN PATENTS OR APPLICATIONS
2,244,262  3/1973  Germany.......................... 260/314.5

*Primary Examiner*—Harry I. Moatz
*Attorney, Agent, or Firm*—Vincent J. Cavalieri

[57] ABSTRACT

Tetra-(alkylsulphamoyl)-copper phthalocyanines of the formula

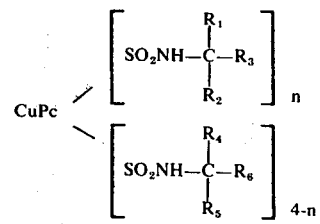

wherein CuPc denotes a copper phthalocyanine radical, $R_1$, $R_2$ and $R_3$ denote alkyl radicals with a total of 7 – 12 C atoms, $R_4$, $R_5$ and $R_6$ denote alkyl radicals with a total of 11 – 13 C atoms and $n$ denotes 0 – 4 have a good solubility an alcohol and are particularly suitable for dyeing alcoholic solutions of film-forming polymers.

4 Claims, No Drawings

TETRA-(ALKYLSULPHAMOYL)-COPPER PHTHALOCYANINES AND A PROCESS FOR THEIR MANUFACTURE

It has been found that new, valuable tetra-(alkyl-sulphamoyl)-copper phthalocyanines of the formula

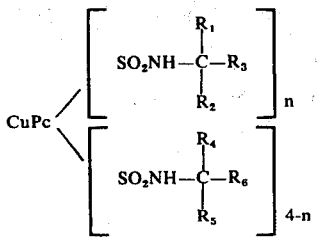

wherein CuPc denotes a copper phthalocyanine radical, $R_1$, $R_2$ and $R_3$ denote alkyl radicals with a total of 7 – 12 C atoms, $R_4$, $R_5$ and $R_6$ denote alkyl radicals with a total of 11 – 13 C atoms, and $n$ denotes 0 – 4, are obtained if 1 mol of copper phthalocyanine tetrasulphonylchloride is reacted with $n$ mols of an amine of the formula

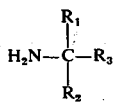

and 4-$n$ mols of an amine of the formula

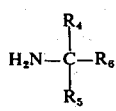

Tetra-(alkylsulphamoyl)-copper phthalocyanines

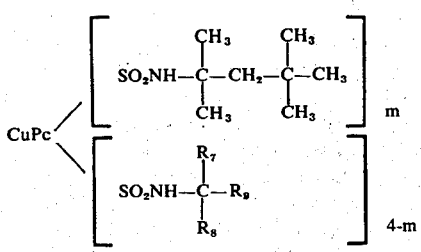

wherein $R_7$, $R_8$ and $R_9$ denote alkyl radicals with a total of 11 – 13 C atoms, and $m$ denotes the number 1–3, and especially those wherein $m$ denotes 2, are of particular interest.

The Cu-Pc tetrasulphochlorides used as starting materials are obtained by a known process by reacting CuPc with chloro-sulphonic acid at elevated temperature, an after-treatment with thionyl chloride being advisable in order to convert free sulphonic acid groups which may still be present. The Cu-Pc sulphochlorides formed can then be isolated from the reaction mixture in the usual manner. It is known that a fairly small proportion of trisulphonyl chloride is always formed in addition to the tetrasulphonyl chloride. The sulphonamides obtained according to the invention are, therefore, a mixture of tetrasulphonamides and trisulphonamides.

A mixture of $m$ mols of the octylamine of the formula

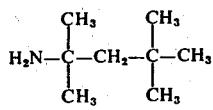

and 4-$m$ mols of a mixture of amines, available under the trade name Primene 81-R, of the formula

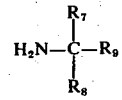

wherein $R_7$, $R_8$ and $R_9$ denote alkyl radicals with a total of 11 – 13 C atoms, and $m$ denotes the number 1 – 3, especially 2, is preferably used as the amines.

The reaction is preferably carried out in an aqueous medium in the presence of acid-binding agents, such as alkali metal hydroxides or alkaline earth metal hydroxides, alkali metal carbonates, alkali metal acetates or tertiary bases, such as pyridine. An excess of the amines employed for the reaction is appropriately used as the acid-binding agent, whereby the hydrochlorides of these amines are formed, from which the amines can be regenerated again after the reaction. The reaction temperature can vary within wide limits; it is advantageous to operate at fairly low temperatures, for example between 0° and 20°.

As the resulting sulphonamides are insoluble in water, they can be isolated easily from the reaction mixture by filtration.

The resulting CuPc tetrasulphonamides are distinguished by outstanding solubility in organic solvents, especially in lower alkanols, such as methanol, ethanol, n-propanol or iso-propanol, in alkylene glycol monoalkyl ethers, for example in ethylene glycol monomethyl or monoethyl ether, in alkylene glycols, such as propylene glycols, or in araliphatic alcohols, such as benzyl alcohol, or in mixtures of alcohols of this kind, and also in lower aliphatic ketones, for example acetone, methyl ethyl ketone, methyl isobutyl ketone or cyclohexanone, and also in carboxylic acid esters, for example methyl acetate, ethyl acetate, butyl acetate or glycol monoacetate, in aromatic hydrocarbons, such as benzene, toluene or xylene, and in halogenated hydrocarbons, preferably lower aliphatic hydrocarbons, such as chloroform, methylene chloride, ethylene chloride or carbon tetrachloride.

The solutions are distinguished by an exceptional stability.

By virtue of their good solubility in the solvents mentioned, the new dyestuffs are suitable for dyeing solutions of film-forming or fibre-forming polymers.

Owing to their good solubility in the abovementioned ketones, especially acetone, the dye-salts which can be obtained according to the invention are suitable for dyeing cellulose 2½-acetate in a spinning composition.

As a result of their good solubility in alcohol, the new dye-salts are particularly suitable for dyeing alcholic solutions of film-forming polymers.

Alcoholic solutions of film-forming polymers are to be particularly understood here at those liquid lacquers which are suitable for use in printing inks for flexographic printing. Examples of the polymers contained in these solutions are natural resins, such as shellac or manila copal; or cellulose derivatives, for example cellulose ethers, such as ethylcellulose, or cellulose esters, such as nitrocellulose, and also maleate resins or phenol-formaldehyde resins which are preferably modified with colophony, such as the products described in U.S. Pat. No. 2,347,923; polyamide resins, that is to say polycondensation products of polyamines with polycarboxylic compounds, which are described, for example, in U.S. Pat. No. 2,663,649; and also formaldehyde-urea and formaldehyde-melamine condensation products, ketone-form-aldehyde condensation products, polyvinyl acetates or poly-acrylic acid resins, for example poly-butylacrylate resin, or mixtures thereof.

In addition, the alcoholic solutions of film-forming polymers can also contain auxiliaries which are customary in the lacquer industry, such as wetting agents, for example higher fatty acid bis-hydroxyalkylamides, such as coconut oil fatty acid bis(-β-hydroxyethyl)-amide.

These alcoholic solutions of film-forming polymers, which contain dye-salts according to the invention are suitable, for example, for printing materials of various kinds, such as metal foils, for example aluminium foils, paper, glass, sheets and films of synthetic resin and the like. They are stable on storage and produce water-resistant coating on the materials mentioned.

In the following examples, unless otherwise indicated, the parts denote parts by weight and the percentages denote percentages by weight.

EXAMPLE 1

1. Copper phthalocyanine tetrasulphochloride 58 g (0.1 mol) of 100% strength copper phthalocyanine are introduced into 690 g of iron-free chlorosulphonic acid at below 30°C and over the course of approx. ½ hour. The mixture is heated to 110° – 115°C over the course of 1 hour and, after a further hour, is heated to 140° – 145°C. The temperature is then kept at 140° – 145°C for 4 hours and the mixture is then cooled to 80°C and 57½ g of thionyl chloride are added dropwise at this temperature over the course of ½ an hour. The temperature is kept at 80°C for a further hour and the mixture is then allowed to cool to room temperature overnight. The reaction mixture is then poured into 500 ml of water and 1,000 g of ice, a further 3,000 g of ice being added during the pouring operation. The mixture is stirred for a further ½ hour and the product is filtered off and washed with 3,000 g of water and a little ice, until the last runnings of the wash water react neutral, or produce a trace of greyness, with Congo indicator.

2. Copper phthalocyanine tetrasulphonamide

The Cu-Pc tetrasulphochloride which has been filtered off is suspended in 500 ml of water and 500 g of ice, the suspension is made up to a volume of 1,600 ml with water and its pH is adjusted to 6 – 6½ by means of approx. ½ g of 100% strength NaOH in 5 ml of water. A mixture of 82.4 g of Primene 81-R = 0.414 mol (ex Rohm and Haas) and 53.4 g of tert. octylamine = 0.414 mol (ex Rohm and Haas) is then added dropwise at a temperature below 3°C (direct cooling by adding ice) over the course of 4 – 5 hours. 300 g of ice are added in 3 portions during the dropwise addition of the alkylamines. The mixture is allowed to reach room temperature overnight. 10 g of 100% strength formic acid (as approx. 85% strength material) are then added over the course of 10 minutes, so that the reaction mixture has a distinctly acid reaction to litmus. The temperature is now raised by 10°C per hour until it has reached 55°C and the mixture is kept at this temperature for 2 – 3 hours. During this time a further 4 g of formic acid are added. The mixture is then cooled to 35°C and is then filtered. The product is washed first with 2,000 ml of water at 35°C containing 2 g of formic acid and then with a further 1,000 ml of water at 35°C and is then dried at 80°C in a drying cabinet. Yield: 150 g of the dyestuff of the formula

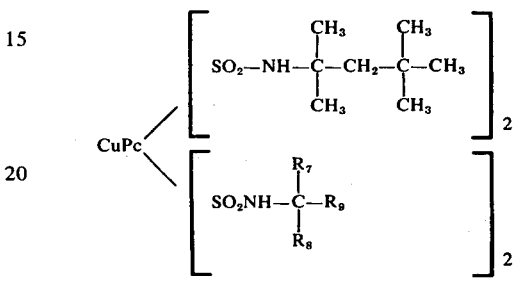

wherein $R_7$, $R_8$ and $R_9$ together contain 11–13 C atoms.

EXAMPLE 2

The Cu-Pc tetrasulphochloride obtained according to Example 1, as material onto the filter, from 58 g (0.1 mol) of copper phthalocyanine is suspended in 500 ml of water and 500 g of ice and the suspension is made up to a volume of 1,600 ml with water. The pH of this suspension is adjusted to 6 by the cautious addition of ½ – 1 g of 100% strength NaOH in 10 ml of water. A mixture of 41.2g of Primene 81-R = 0.207 mol (ex Rohm and Haas) and 80.1 g of tert. octylamine = 0.621 mol is then added dropwise at a temperature of below 3°C (direct cooling by adding ice) over the course of 4 – 5 hours. 300 g of ice are added in 3 portions during the dropwise addition of the alkylamines. The mixture is allowed to reach room temperature overnight. 10–15 ml of 100% strength formic acid (as 85% strength material) are then added over the course of 10 minutes, so that the reaction mixture has a distinctly acid reaction to litmus. The temperature is now raised by 10°–15°C per hour until it has reached 55°–60°C and the mixture is kept at this temperature for approx. 2 hours, during which time a further 4–5 g of formic acid are added. The mixture is then heated to 35°C and is then filtered. The material on the filter is washed with 200 ml of water at 35° and 2 ml of formic acid and then once more with 1,000 ml of water at 35°C. After being well filtered off with suction, the material on the filter is dried at 80°C in a drying cabinet. Approx. 140 g are obtained of the dyestuff of the formula:

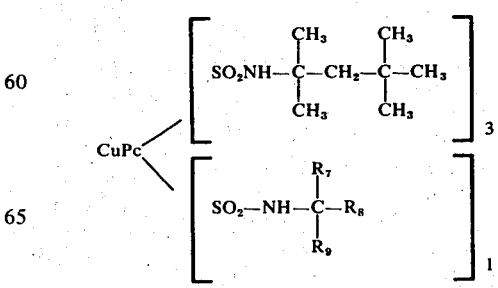

in which $R_7$, $R_8$ and $R_9$ denote alkyl radicals having a total of 11–13 C atoms.

EXAMPLE 3

20 g of the dyestuff obtainable according to Example 1, 30 g of bleached, wax-free shellac, 5 g of dibutyl phthalate and 45 g of ethanol are mixed.

This gives a printing ink of good storage stability, which can be used as such or diluted with ethanol for flexographic printing on paper sheets and aluminium foils. Blue, full, light-fast printings of good adhesion are obtained on the materials mentioned by means of this printing ink.

EXAMPLE 4

10 g of the dyestuff obtainable according to Example 1 are stirred into 90 g of a solution consisting of 25% of a spirit-soluble polyamide resin, modified with esters, for example prepared according to Example 7 of U.S. Pat. No. 2,663,649, 2% of water, 5% of benzine fraction boiling between 80° and 100°C, 48% of ethanol and 20% of isopropanol.

This gives a printing ink which, in flexographic printing, dyes cellulose film in a blue colour shade of good adhesion and fastness to light.

EXAMPLE 5

2.6 g of the dyestuff according to Example 1 are sprinkled onto 100 g of a solution of acetylcellulose in acetone, having a solids content of 26%. 20 ml of acetone are then added and the mixture is tumbled in a well closed flask on a roller stand until the dyestuff is completely dissolved. The dyed spinning solution is then pressed through spinnerets. The filament formed passes through a fairly long heated tube and can then be wound up directly. the dyed material exhibits a blue colour shade and has excellent fastness properties, especially complete fastness to washing, water, cross-dyeing, dry cleaning, rubbing, ironing and light.

What we claim is:

1. A tetra-(alkylsulphamoyl)-copper phthalocyanine of the formula

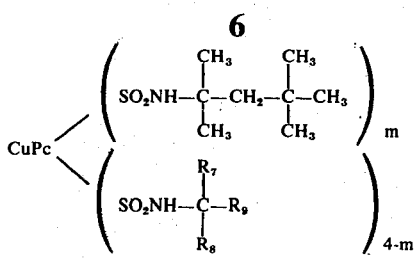

wherein CuPc denotes a copper phthalocyanine radical where each benzene ring in said radical contains one sulphonamide group; $R_7$, $R_8$ and $R_9$ denote alkyl radicals with a total of 11–13 C atoms and $m$ denotes the number 1–3.

2. A tetra-(alkylsulphamoyl)-copper phthalocyanine according to claim 1, wherein $m$ denotes the number 2.

3. A tetra-(alkyl-sulphamoyl)-copper phthalocyanine according to claim 2, of the formula

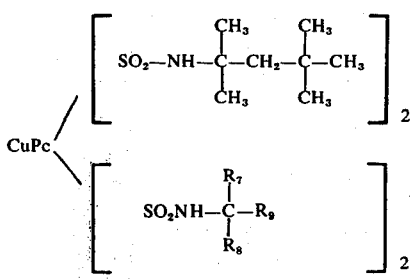

wherein $R_7$, $R_8$ and $R_9$ together contain 11–13 C atoms.

4. A tetra-(alkyl-sulphamoyl)-copper phthalocyanine according to claim 2, of the formula

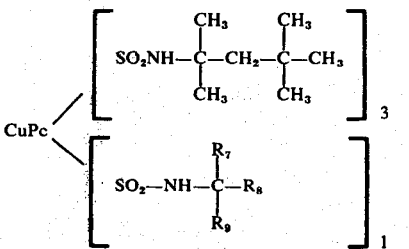

in which $R_7$, $R_8$ and $R_9$ denote alkyl radicals having a total of 11–13 C atoms.

* * * * *